US010664783B2

(12) United States Patent
DiPippo et al.

(10) Patent No.: US 10,664,783 B2
(45) Date of Patent: May 26, 2020

(54) SYSTEM AND METHODS FOR MANAGING CHANGES TO A PRODUCT IN A MANUFACTURING ENVIRONMENT INCLUDING CONVERSION OF AN ENGINEERING BILL OF MATERIAL TO A MANUFACTURING BILL OF MATERIAL

(71) Applicant: The Boeing Company, Chicago, IL (US)

(72) Inventors: Edward A. DiPippo, Brier, WA (US); Kyle Kurtis Hagberg, Bothell, WA (US); Christopher Luis Carpenter, Bothell, WA (US); Max Neal Jensen, Redmond, WA (US); Anthony John Williams, Mill Creek, WA (US)

(73) Assignee: THE BOEING COMPANY, Chicago, IL (US)

( * ) Notice: Subject to any disclaimer, the term of this patent is extended or adjusted under 35 U.S.C. 154(b) by 991 days.

(21) Appl. No.: 14/991,261

(22) Filed: Jan. 8, 2016

(65) Prior Publication Data
US 2017/0200121 A1 Jul. 13, 2017

(51) Int. Cl.
G06Q 10/06 (2012.01)
G06Q 10/08 (2012.01)

(52) U.S. Cl.
CPC ..... *G06Q 10/06315* (2013.01); *G06Q 10/067* (2013.01); *G06Q 10/063114* (2013.01); *G06Q 10/0875* (2013.01)

(58) Field of Classification Search
None
See application file for complete search history.

(56) References Cited

U.S. PATENT DOCUMENTS 5,197,001 A * 3/1993 Mukherjee ........... G06Q 10/087
700/99
5,586,052 A 12/1996 Iannuzzi et al.
(Continued)

FOREIGN PATENT DOCUMENTS

CN 203502999 U 3/2014
CN 104346143 A 2/2015

OTHER PUBLICATIONS

Matthew Yglesias, The emerging Boeing 737 Max scandal, explained—Vox, Mar. 29, 2019 https://www.vox.com/business-and-finance/2019/3/29/18281270/737-max-faa-scandal-explained (Year: 2019).*

(Continued)

*Primary Examiner* — Octavian Rotaru
(74) *Attorney, Agent, or Firm* — Armstrong Teasdale LLP

(57) ABSTRACT

A manufacturing process management (MPM) computer device is provided. The MPM computer device is configured to store an engineering bill of materials for a product to be assembled including a first plurality of parts, store a manufacturing bill of materials for the product to be assembled including a second plurality of parts and a status, receive a request from a user to change the status of the manufacturing bill of materials, compare the first plurality of parts with the second plurality of parts, determine whether the first plurality of parts matches the second plurality of parts based on the comparison, if the comparison matches, change the status of the manufacturing bill of materials, and if the comparison does not match, prevent the status of the manufacturing bill of materials from changing.

21 Claims, 9 Drawing Sheets

(56) References Cited

U.S. PATENT DOCUMENTS

| | | | |
|---|---|---|---|
| 6,144,890 A | 11/2000 | Rothkop | |
| 6,167,406 A | 12/2000 | Hoskins et al. | |
| 6,272,389 B1* | 8/2001 | Dietrich | G06Q 10/06 |
| | | | 700/101 |
| 6,295,513 B1 | 9/2001 | Thackston | |
| 6,453,209 B1 | 9/2002 | Hill et al. | |
| 6,819,967 B2 | 11/2004 | Ballas et al. | |
| 6,844,877 B1* | 1/2005 | Rajkumar | G06F 30/17 |
| | | | 345/420 |
| 6,871,182 B1 | 3/2005 | Winnard et al. | |
| 7,050,874 B1 | 5/2006 | Tenorio | |
| 7,149,760 B1 | 12/2006 | Breuer | |
| 7,171,375 B2 | 1/2007 | Clarke | |
| 7,275,245 B2 | 9/2007 | Huber | |
| 7,321,804 B2 | 1/2008 | Zayic et al. | |
| 8,401,687 B2 | 3/2013 | Kohlhoff | |
| 8,781,922 B2 | 7/2014 | Shafiee et al. | |
| 8,799,113 B2 | 8/2014 | Markham et al. | |
| 9,317,626 B2 | 4/2016 | Chan | |
| 2002/0026629 A1 | 2/2002 | Utsumi | |
| 2002/0040257 A1 | 4/2002 | Baumgartner et al. | |
| 2002/0118222 A1 | 8/2002 | Fogarty | |
| 2003/0018405 A1 | 1/2003 | Walacavage et al. | |
| 2003/0097246 A1 | 5/2003 | Hara et al. | |
| 2003/0220853 A1 | 11/2003 | Back et al. | |
| 2004/0098382 A1 | 5/2004 | Chuang et al. | |
| 2004/0148601 A1 | 7/2004 | Kroening | |
| 2006/0106685 A1 | 5/2006 | Cheng et al. | |
| 2006/0129262 A1 | 6/2006 | Zayic et al. | |
| 2007/0021993 A1 | 1/2007 | Chandra et al. | |
| 2007/0073679 A1 | 3/2007 | Fu et al. | |
| 2007/0106409 A1 | 5/2007 | Anelle | |
| 2007/0219929 A1 | 9/2007 | Steinbach | |
| 2008/0051923 A1 | 2/2008 | Knipfer et al. | |
| 2009/0069919 A1* | 3/2009 | Erickson | G06Q 10/00 |
| | | | 700/97 |
| 2009/0099678 A1* | 4/2009 | Kurata | G05B 19/41865 |
| | | | 700/106 |
| 2011/0119231 A1 | 5/2011 | Namburu et al. | |
| 2013/0067362 A1* | 3/2013 | Cowart | G06Q 10/06 |
| | | | 715/763 |
| 2015/0112468 A1 | 4/2015 | Rudnick et al. | |
| 2015/0262124 A1* | 9/2015 | Martinez-Ablanedo | |
| | | | G06F 16/00 |
| | | | 705/29 |
| 2015/0331972 A1 | 11/2015 | McClure et al. | |
| 2016/0098034 A1 | 4/2016 | Hanlin et al. | |
| 2016/0154900 A1 | 6/2016 | Ni et al. | |
| 2016/0265576 A1 | 9/2016 | Hoffmann et al. | |
| 2017/0199514 A1 | 7/2017 | Dipippo et al. | |

OTHER PUBLICATIONS

Boeing, Airport Compatibility, archives org, Jan. 6, 2016 https://web.archive.org/web/20160106000519/http://www.boeing.com/commercial/airports (Year: 2016).*

Fetters-Walp Ertic, Boeing commercial jetliners make an ideal platform for a variety of military derivative aircraft, Boeing Frontiers, Nov. 2010 https://www.boeing.com/news/frontiers/archive/2010/november/cover.pdf (Year: 2010).*

EPO Extended Search Report for related application 161914780.2 dated Mar. 3, 2017, 7 pp.

* cited by examiner

SYSTEM AND METHODS FOR MANAGING CHANGES TO A PRODUCT IN A MANUFACTURING ENVIRONMENT INCLUDING CONVERSION OF AN ENGINEERING BILL OF MATERIAL TO A MANUFACTURING BILL OF MATERIAL

BACKGROUND

The present disclosure relates generally to managing engineering and manufacturing changes to a product and, more specifically, to managing changes to a product before, during, and after the product is in production.

As products get larger and more complicated, the difficulty to track all of the parts and processes required to manufacture these products exponentially increases. In addition, there is potentially a large disconnect between the engineers who design the products, the engineers who determine how to manufacture the product, and the mechanics who manufacture the product. These groups may each be on different continents. Clear communication between these groups is vital to ensure that the product is properly assembled. Furthermore, the larger the product, the more documents and paperwork that must be reviewed to ensure that the product successfully transitions from the drawing board to the final product.

Moreover, changes may be made to the product design after the product has gone into production. For example, parts may become unavailable or requirements may change. This is especially a problem for products that require significant amounts of time to assemble, such as day, weeks, or months. Any changes that occur must be carefully traced throughout design documents and manufacturing documents to ensure that all effects of the change are made in the final product.

BRIEF DESCRIPTION

In one aspect, a manufacturing process management (MPM) computer device is provided. The MPM computer device includes a processor and at least one memory device. The processor is in communication with the at least one memory device. The MPM computer device is configured to store an engineering bill of materials for a product to be assembled including a first plurality of parts, store a manufacturing bill of materials for the product to be assembled including a second plurality of parts and a status, receive a request from a user to change the status of the manufacturing bill of materials, for each of the first plurality of parts, compare the first plurality of parts with the second plurality of parts, determine whether the first plurality of parts matches the second plurality of parts based on the comparison, if the determination is that the first plurality of parts matches the second plurality of parts, change the status of the manufacturing bill of materials, and if the determination is that the first plurality of parts does not match the second plurality of parts, prevent the status of the manufacturing bill of materials from changing.

In another aspect, a computer implemented method for managing changes to a product in a manufacturing environment is provided. The method is implemented using a manufacturing process management (MPM) computer device in communication with a memory. The method includes storing an engineering bill of materials for a product to be assembled including a first plurality of parts, storing a manufacturing bill of materials for the product to be assembled including a second plurality of parts and a status, receiving a request from a user to change the status of the manufacturing bill of materials, for each of the first plurality of parts, comparing the first plurality of parts with the second plurality of parts, determining whether the first plurality of parts matches the second plurality of parts based on the comparison, if the determination is that the first plurality of parts matches the second plurality of parts, changing the status of the manufacturing bill of materials, and if the determination is that the first plurality of parts does not match the second plurality of parts, preventing the status of the manufacturing bill of materials from changing.

In yet another aspect, at least one non-transitory computer-readable storage media having computer-executable instructions embodied thereon is provided. When executed by manufacturing process management computer device having at least one processor coupled to at least one memory device, the computer-executable instructions cause the processor to store an engineering bill of materials for a product to be assembled including a first plurality of parts, store a manufacturing bill of materials for the product to be assembled including a second plurality of parts and a status, receive, from a user, a request to change the status of the manufacturing bill of materials, for each of the first plurality of parts, compare the first plurality of parts with the second plurality of parts, determine whether the first plurality of parts matches the second plurality of parts based on the comparison, if the determination is that the first plurality of parts matches the second plurality of parts, change the status of the manufacturing bill of materials, and if the determination is that the first plurality of parts does not match the second plurality of parts, prevent the status of the manufacturing bill of materials from changing.

DETAILED DESCRIPTION

Figure 1:
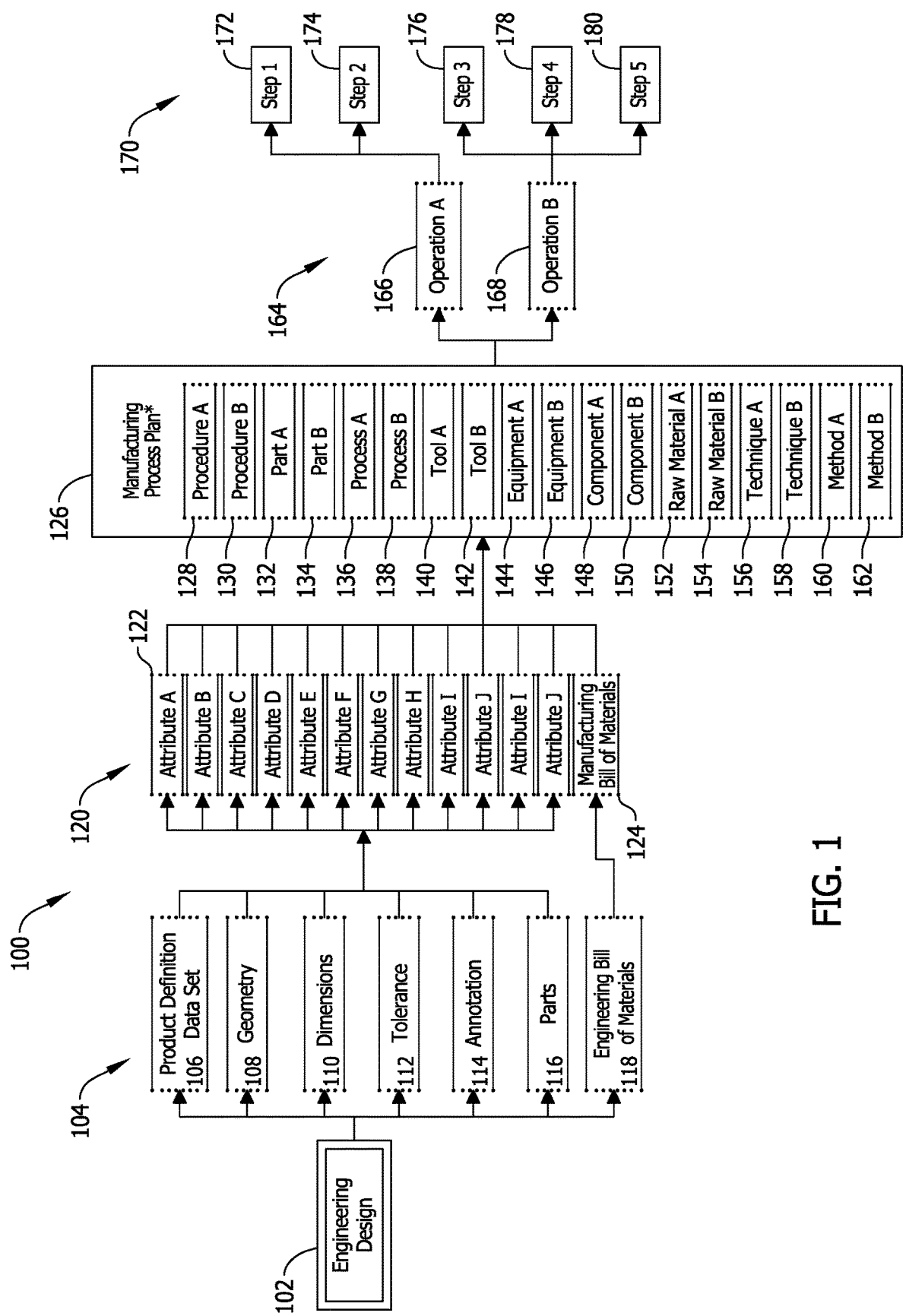
FIG. 1 illustrates a diagram of a flow from an engineering document to one or more individual steps necessary to manufacture a product.

The implementations described herein relate to systems and methods for managing engineering and manufacturing changes to a product and, more specifically, to managing changes to a product before, during, and after the product is in production. More specifically, a manufacturing process management ("MPM") computer device is configured to manage engineering requirements based on completed operations, pre-generate a manufacturing bill of materials, manage a manufacturing bill of materials, and use a grid overlay with multiple versions of a product.

Described herein are computer systems such as the MPM computer devices and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory or media usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and processes are not limited to the specific embodiments described herein. In addition, components of each system and each process can be practiced independent and separate from other components and processes described herein. Each component and process also can be used in combination with other assembly packages and processes.

FIG. 1 illustrates a diagram of a flow 100 from an engineering design 102 to one or more individual steps necessary to manufacture a product. In the example embodiment, engineering design 102 includes a plurality of features 104 of the product to manufacture. These features 104 of the product include product definition data sets 106, geometries 108, dimensions 110, tolerances 112, and annotations 114, all of which define the product as defined by the engineers who designed the product. Features 104 also include parts 116, which include items, parts, components, sub-assemblies, assemblies, and/or industrial products. Engineering design 102 also includes an engineering bill of materials 118 (EBOM). The features 104 convert to a plurality of attributes 120 such as attribute A 122. The engineering bill of materials 118 is converted to a manufacturing bill of materials 124 (MBOM).

The features 104, attributes 120, and manufacturing bill of materials 124 are converted into a manufacturing process plan 126 (MPP). MPP 126 outlines the manufacturing procedures, processes, tools, equipment, techniques, and methods of production of the product as planned by the manufacturing engineering. MPP 126 further outlines exactly how to build the product, from the parts used and how they relate to each other, to the processes that the mechanics and engineers use to install each of the parts that make up the whole. MPP 126 is an indentured, descriptive, and quantitative listing of all components, sub-assemblies, and raw materials that go into a parent assembly or installation. MPP 126 identifies what is to be bought and/or manufactured to provide delivery of the finished product. The manufacturing process plan 126 includes procedures, such as procedure A 128 and procedure B 130; parts, such as part A 132 and part B 134; processes, such as process A 136 and process B 138; tools, such as tool A 140 and tool B 142; equipment, such as equipment A 144 and equipment B 146; components, such as component A 148 and component B 150; raw materials, such as raw material A 152 and raw material B 154; techniques, such as technique A 156 and technique B 158; and methods, such as method A 160 and method 162.

Manufacturing process plan 126 breaks down in a plurality of operations 164 including operation A 166 and operation B 168. Each operation includes a plurality of steps 170. For example, operation A 166 includes step 1 172 and step 2 174. And operation B 168 includes step 3 176, step 4 178, and step 5 180.

Engineering bill of materials 118, also known as an EBOM, defines a product as designed. It is the list of items, parts, components, sub-assemblies, and assemblies in the product designed by engineering. A manufacturing bill of materials (MBOM) 124, also referred to as the manufacturing BOM, contains all the parts and assemblies required to build a complete and shippable product. Unlike engineering bill of materials 118, which is organized with regards to how the product is designed, the MBOM 124 is focused on the parts that are needed to manufacture a product. In addition to the parts list in an EBOM 118, the MBOM 124 also includes information about how the parts relate to each other. An MBOM 124 is not the same as "as manufactured" or "as built".

As a part of the engineering design 102, engineering releases an engineering bill of materials 118, which lists the parts required for the product, and the requirements for manufacturing the product. The EBOM 118 includes the parts, such as a fastener, while the engineering requirements state that the fastener needs to be torqued by 60 ft. lbs.

Figure 2:
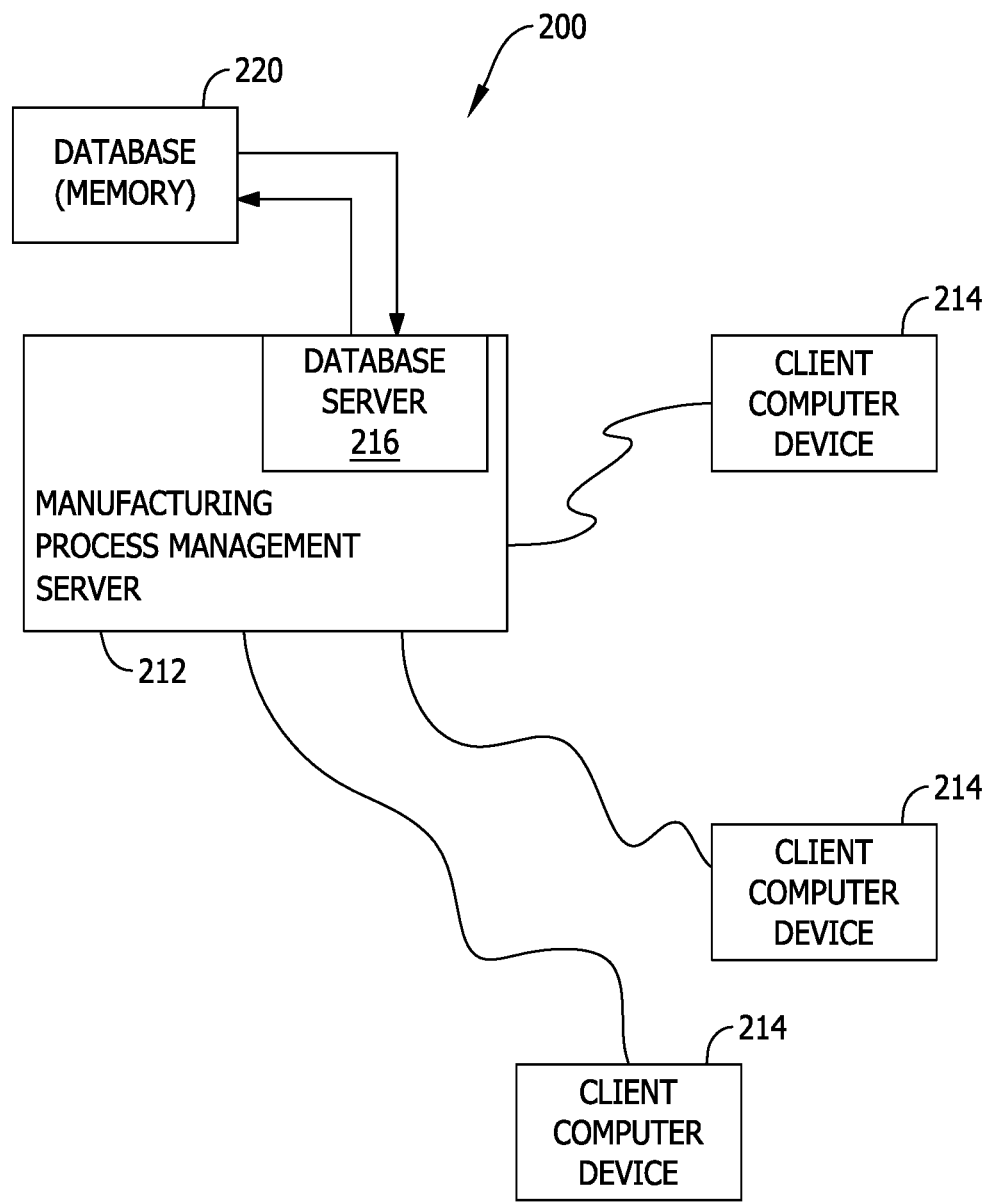
FIG. 2 is a simplified block diagram of an example system for managing changes in a product in a manufacturing environment in accordance with one embodiment of the present disclosure.

FIG. 2 is a simplified block diagram of an example system 200 used for managing changes in a product in a manufacturing environment in accordance with one embodiment of the disclosure. In the example embodiment, system 200 is used for tracking changes to the manufacturing of a product, monitoring the manufacturing steps as they are performed, ensuring that the engineering requirements are met by those manufacturing the product, and further monitoring the manufacture of the product across multiple configurations, versions, revisions, and change levels of the product, in addition to over multiple manufacturing lines potentially in multiple locations. In addition, system 200 is a manufacturing management system that includes manufacturing process management ("MPM") computer device 212 (also known as an MPM server) configured to manage changes to the manufacturing of a product. As described below in more detail, MPM server 212 is configured to manage engineering requirements based on completed operations, pre-generate a manufacturing bill of materials, manage a manufacturing bill of materials, and use a grid overlay with multiple versions of a product.

In the example embodiment, client computer devices 214 are computers that include a web browser or a software application, which enables client computer devices 214 to access MPM server 212 using the Internet, a local area network (LAN), or a wide area network (WAN). More specifically, client computer devices 214 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Client computer devices 214 can be any device capable of accessing the Internet including, but not limited to, a desktop computer, a laptop computer, a personal digital assistant (PDA), a cellular phone, a smartphone, a tablet, a phablet, or other web-based connectable equipment. In some embodiments, client computer devices 214 are used by engineers, manufacturing engineers, mechanics, manufacturing technicians, ordering specialists, and anyone else needing to access information related to the manufacture of the product, such as shown in FIG. 1.

A database server 216 is communicatively coupled to a database 220 that stores data. In one embodiment, database 220 includes engineering designs, manufacturing process plans, engineering bills of materials, and manufacturing bills of materials. In the example embodiment, database 220 is stored remotely from MPM server 212. In some embodiments, database 220 is decentralized. In the example embodiment, a person can access database 220 via client computer devices 214 by logging onto MPM server 212, as described herein.

MPM server 212 is communicatively coupled with the client computer devices 214. In some embodiments, MPM server 212 is decentralized and composed of a plurality of computer devices which work together as described herein.

Figure 3:
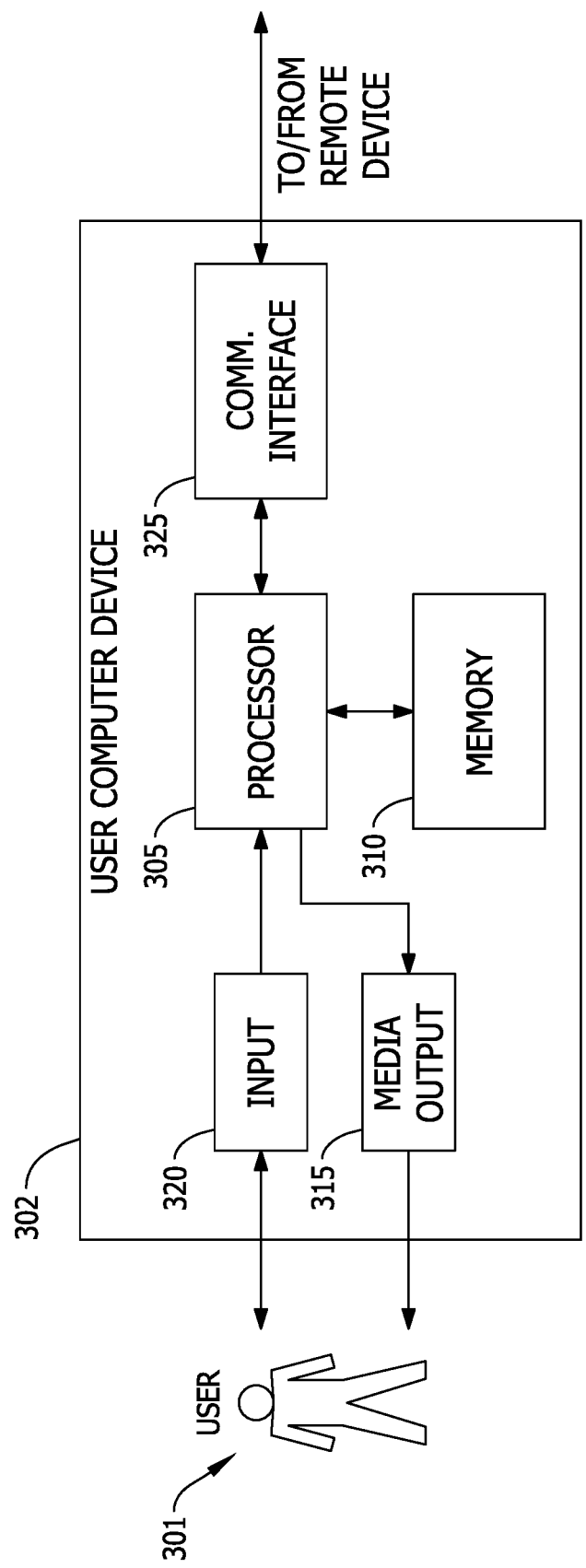
FIG. 3 illustrates an example configuration of a client computer device shown in FIG. 2, in accordance with one embodiment of the present disclosure.

FIG. 3 illustrates an example configuration of a client computer device 214 shown in FIG. 2, in accordance with one embodiment of the present disclosure. User computer device 302 is operated by a user 301. User computer device 302 may include, but is not limited to, client computer devices 214 (shown in FIG. 2). User computer device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or transaction data to be stored and retrieved. Memory area 310 may include one or more computer readable media.

User computer device 302 also includes at least one media output component 315 for presenting information to user 301. Media output component 315 is any component capable of conveying information to user 301. In some embodiments, media output component 315 includes an output adapter (not shown) such as a video adapter and/or an audio adapter. An output adapter is operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 315 is configured to present a graphical user interface (e.g., a web browser and/or a client application) to user 301. A graphical user interface may include, for example, an online store interface for viewing and/or purchasing items, and/or a wallet application for managing payment information. In some embodiments, user computer device 302 includes an input device 320 for receiving input from user 301. User 301 may use input device 320 to, without limitation, select and/or enter one or more items to purchase and/or a purchase request, or to access credential information, and/or payment information. Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computer device 302 may also include a communication interface 325, communicatively coupled to a remote device such as MPM server 212 (shown in FIG. 2). Communication interface 325 may include, for example, a wired or wireless network adapter and/or a wireless data transceiver for use with a mobile telecommunications network.

Stored in memory area 310 are, for example, computer readable instructions for providing a user interface to user 301 via media output component 315 and, optionally, receiving and processing input from input device 320. A user interface may include, among other possibilities, a web browser and/or a client application. Web browsers enable users, such as user 301, to display and interact with media and other information typically embedded on a web page or a website from MPM server 212. A client application allows user 301 to interact with, for example, MPM server 212. For example, instructions may be stored by a cloud service, and the output of the execution of the instructions sent to the media output component 315.

Processor 305 executes computer-executable instructions for implementing aspects of the disclosure. In some embodiments, the processor 305 is transformed into a special purpose microprocessor by executing computer-executable instructions or by otherwise being programmed.

Figure 4:
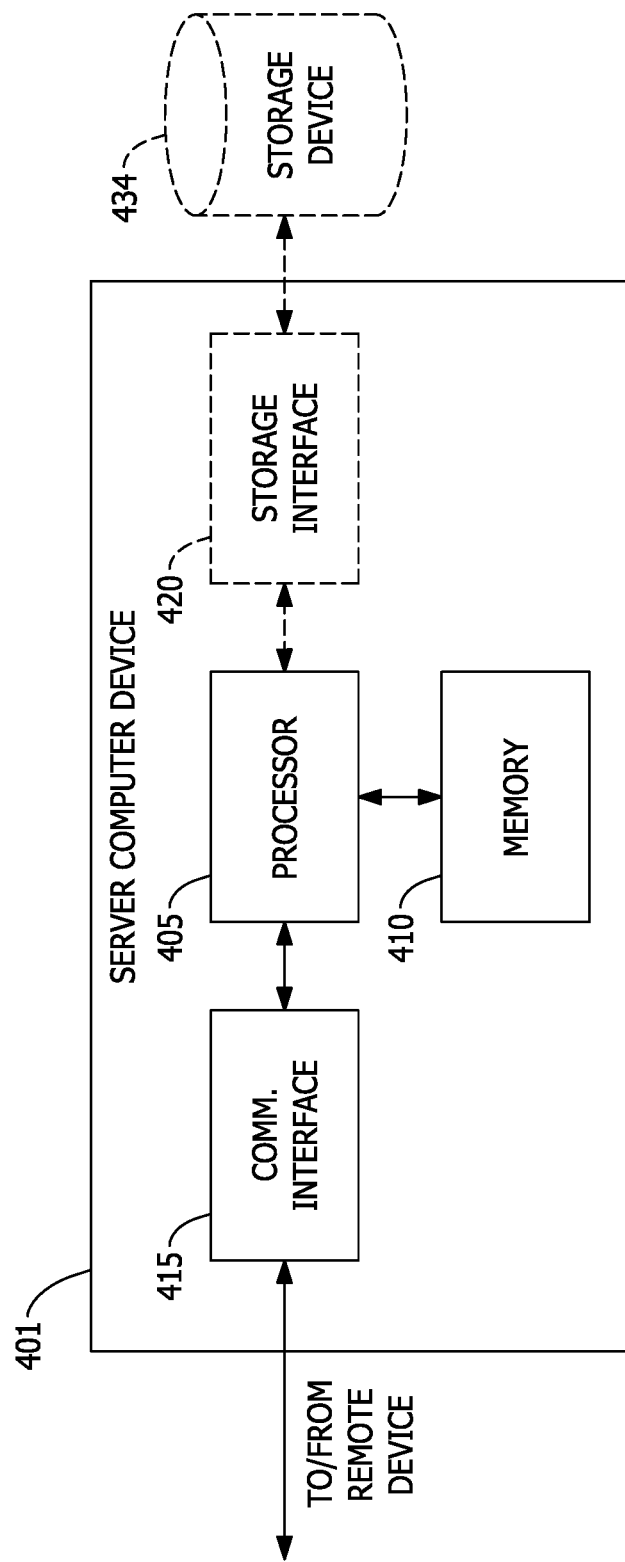
FIG. 4 illustrates an example configuration of the server system shown in FIG. 2, in accordance with one embodiment of the present disclosure.

FIG. 4 illustrates an example configuration of the server system shown in FIG. 2, in accordance with one embodiment of the present disclosure. Server computer device 401 may include, but is not limited to, database server 216 and MPM server 212 (all shown in FIG. 2). Server computer device 401 also includes a processor 405 for executing instructions. Instructions may be stored in a memory area 410 comprising a memory device. Processor 405 may include one or more processing units (e.g., in a multi-core configuration).

Processor 405 is operatively coupled to a communication interface 415 such that server computer device 401 is capable of communicating with a remote device such as another server computer device 401, another MPM server 212, or client computer devices 214 (shown in FIG. 2). For example, communication interface 415 may receive requests from client computer devices 214 via the Internet, as illustrated in FIG. 2.

Processor 405 may also be operatively coupled to a storage device 434. Storage device 434 is any computer-operated hardware suitable for storing and/or retrieving data, such as, but not limited to, data associated with database 220 (shown in FIG. 2). In some embodiments, storage device 434 is integrated in server computer device 401. For example, server computer device 401 may include one or more hard disk drives as storage device 434. In other embodiments, storage device 434 is external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Processor 405 executes computer-executable instructions for implementing aspects of the disclosure. In some embodiments, the processor 405 is transformed into a special purpose microprocessor by executing computer-executable instructions or by otherwise being programmed. For example, the processor 405 is programmed with the instruction such as illustrated in FIGS. 5-8.

Figure 5:
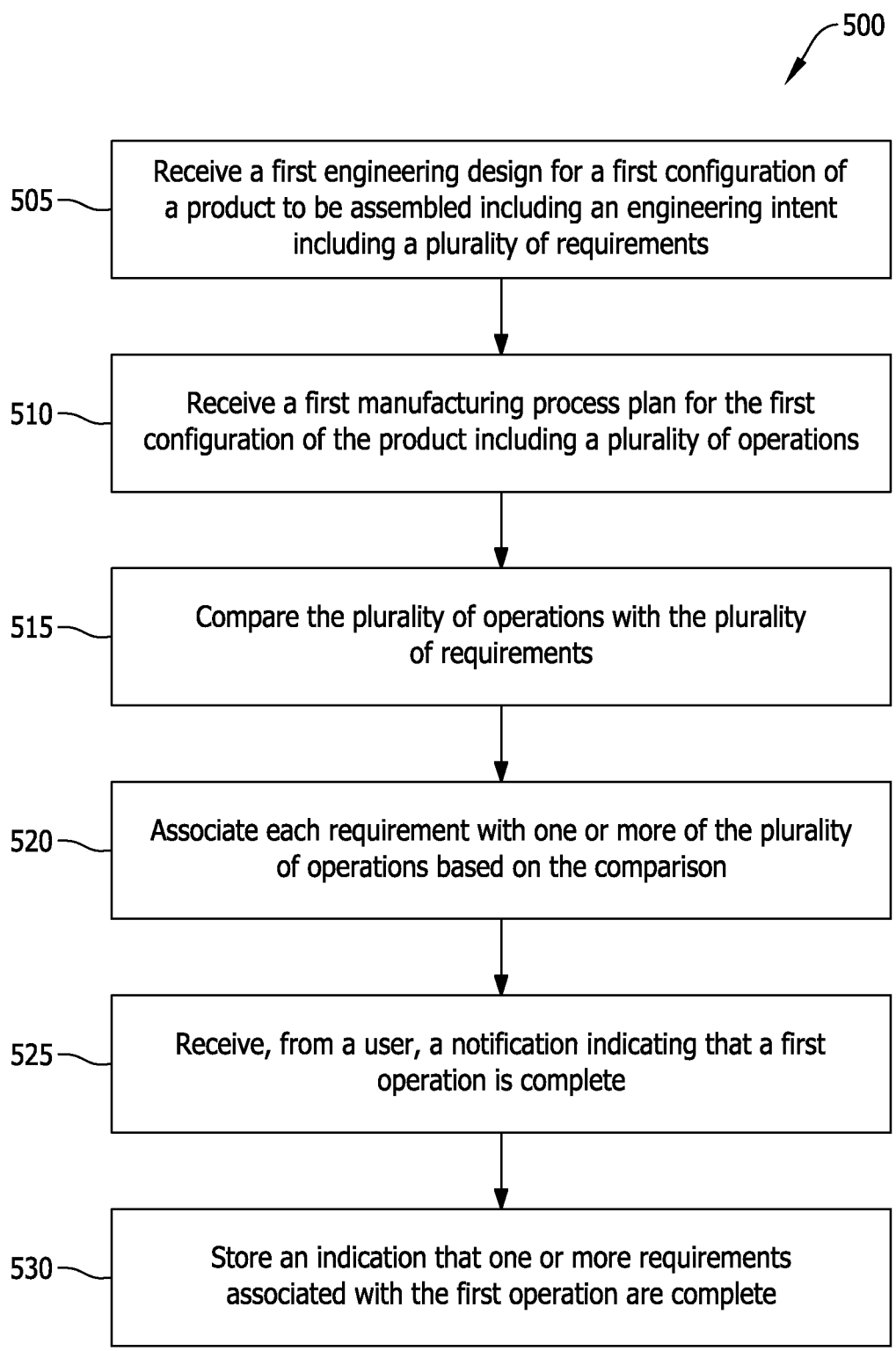
FIG. 5 is a flowchart illustrating an example of a process of managing engineering requirements based on completed operations using the system shown in FIG. 2, in accordance with one embodiment of the disclosure.

FIG. 5 is a flowchart illustrating an example of a process 500 of managing engineering requirements based on completed operations using system 200 shown in FIG. 2, in accordance with one embodiment of the disclosure. Process 500 may be implemented by a computing device, for example MPM server 212 (shown in FIG. 2).

In the example embodiment, MPM server 212 receives 505 a first engineering design 102 (shown in FIG. 1) for a first configuration of a product to be assembled including an engineering bill of materials 118 (shown in FIG. 1) and a plurality of requirements. MPM server 212 receives 510 a first manufacturing process plan 124 (shown in FIG. 1) for the first configuration of the product including a plurality of operations 164 (shown in FIG. 1). MPM server 212 compares 515 plurality of operations 164 with the plurality of requirements to determine whether each requirement of the plurality of requirements is met by at least one of the plurality of operations 164. MPM server 212 associates 520 each requirement with one or more of the plurality of operations 164 based on the comparison. MPM server 212 receives 525, from a user 301 (shown in FIG. 3), a notification indicating that a first operation 166 (shown in FIG. 1) is complete. Then MPM server 212 stores 530 an indication that one or more requirements associated with first operation 166 are complete.

In some embodiments, the engineering design 102 includes acceptable substitutes for parts. For example, engineering design 102 states that either part A or substitute part B could be used. MPM server 212 tracks both of the parts and ensures that one of them is installed. If the substitute part is installed, then MPM server 212 marks that the requirement associated with part A has been completed. In addition, once either part A or substitute part B is installed, MPM server 212 marks the part as installed and prevents the installation of both parts. In these embodiments, MPM server 212 receives a user input indicating that the substitute part was installed at the first location and stores an indication that the first part was installed. In some further embodiments, the substitute part is selected by the user 301 while approving or generating the MPP 126. In these embodiments, only the substitute part is installed.

While the intent of flow 100 is the assembly of a product, in some embodiments it may be necessary to remove one or more parts. In these embodiments, MPM server 212 stores a disassembly plan for each part and installation. When a part is installed, MPM server 212 marks the part as installed and when all of the parts are installed MPM server 212 marks the product as complete. However, if a part is removed, then MPM server 212 marks the part as removed to ensure that the product is not considered complete. In these embodiments, MPM server 212 receives, from the user 301, a first indication that a first part 132 (shown in FIG. 1) was installed and stores the first indication. MPM server 212 marks the product as complete based on the first indication and the first manufacturing process plan 126. MPM server 212 receives, from the user 301, a second indication that the first part 132 was removed and stores the second indication. MPM server 212 marks the product as incomplete based on the second indication.

In some embodiments, the process of approving and/or generating the MPP 126 is a lengthy process that requires every item to be approved before completion. However, many times progress may be lost on the approval process and have to be repeated. MPM server 212 saves the progress on the MPP 126 repeatedly throughout the approval process. Furthermore, MPM server 212 provides an amount and a list of those parts that still need approval to the user 301. In these embodiments, MPM server 212 displays, to the user 301, a plurality of parts 116 (shown in FIG. 1) associated with the first engineering design 102. MPM server 212 receives, from the user 301, an approval of one or more parts of the plurality of parts 116. MPM server 212 generates the first manufacturing process plan 126 based on the one or more approved parts. MPM server 212 also receives, from the user 301, a second approval of one or more additional parts of the plurality of parts 116 and updates the first manufacturing process plan 126 to include the one or more additional parts. MPM server 212 determines a remaining plurality of parts based on the plurality of parts 116 and the one or more approved parts. MPM server 212 determines a number of remaining parts to be approved and displays the determined number and a list of the remaining plurality of parts.

In some embodiments, MPM server 212 assigns a relationship between a first part in the EBOM 118 and a second part in the MBOM 124. These relationships include, but are not limited to, issue, remove, rework, restructure, and reference. An issue relationship is where part is issued to the product to be installed. A remove relationship is where the second part is to be removed from the product. A rework relationship is where the part is assigned to the MBOM 124 but not issued. For example, Part A 132 is reworked to a new part number, Part B 134, where additional holes are drilled into Part A 132 to create Part B 134. A restructure relationship is where the part is changed or restructured between the EBOM 118 and the MBOM 124. A reference relationship is where the first part and the second part reference each other, such as with a part and the glue that attached the part.

In some embodiments, some items are not listed in the bill of materials, for example a sealant used on a part or the 60 ft. lbs. of torque. These requirements are listed in the engineering requirements and the MPM server 212 associates these requirements with the associated parts to ensure that the workers are performed and that these requirements are met. In these embodiments, MPM server 212 determines at least one part of the plurality of parts 116 associated with a requirement of the plurality of requirements. MPM server 212 adds an item to the first manufacturing process plan 126 associated with the at least one part to indicate the determined requirement and displays the determined requirement to the user 301 prior to the user installing the part.

In some embodiments, the user desires an accountability check to be performed on the documents in flow 100 on demand. In these embodiments, MPM server 212 receives an accountability check request from the user. MPM server 212 compares the engineering bill of materials 118 with a manufacturing bill of materials 124 for the first configuration. MPM server 212 generate a report based on the comparison and provides the report to the user 301.

In some embodiments, it is desirable to ensure that the manufacturing engineer approving the parts in the MPP 126 approves all of the parts in an installation before approving the MPP 126. In these embodiments, an installation is included in the EBOM 118, where the installation includes a plurality of parts. An installation being a non-physical collection of parts, such as an entertainment system in an aircraft. MPM server 212 receives, from the user 301, assignment of one or more of the plurality of parts. MPM server 212 receives, from the user 301, a request to approve the installation. MPM server 212 determines whether all of the plurality of parts are assigned. And if the determination is that at least one of the plurality of parts is not assigned, MPM server 212 prevents the user 301 from approving the installation and approving the MPP 126.

In some embodiments, a plurality of parts may be restructured between engineering and manufacturing. For example, parts A, B, and C may be restructured into Part D, where Part D is an assembly of parts A-C. It may be more cost-effective to buy parts A-C already assembled into part D. In these embodiments, MPM server 212 tracks the relationship between parts A-C and part D. So that when part D is installed, MPM server 212 marks parts A-C as installed. In these embodiments, MPM server 212 receives, from the user 301, a restructured part comprising a plurality of parts. MPM server 212 associates the restructured part in the first manufacturing process plan 126 with the plurality of parts in the engineering design 102.

Figure 6:
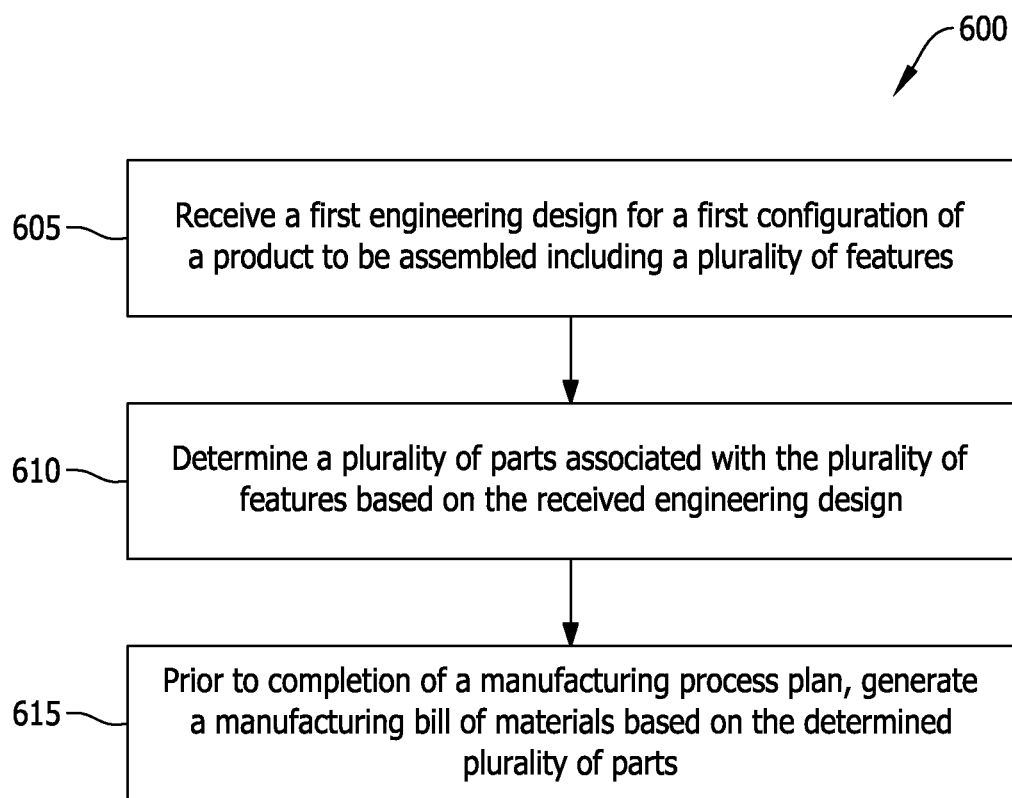
FIG. 6 is a flowchart illustrating an example of a process of pre-generating a manufacturing bill of materials using the system shown in FIG. 2, in accordance with one embodiment of the disclosure.

FIG. 6 is a flowchart illustrating an example of a process 600 of pre-generating a manufacturing bill of materials 124 using system 200 shown in FIG. 2, in accordance with one embodiment of the disclosure. Process 600 may be implemented by a computing device, for example MPM server 212 (shown in FIG. 2).

In the example embodiment, MPM server 212 receives 605 a first engineering design 102 (shown in FIG. 1) for a first configuration of a product to be assembled including a plurality of features 104 (shown in FIG. 1). MPM server 212 determines 610 a plurality of parts 116 (shown in FIG. 1) associated with plurality of features 104 based on the received engineering design 102. MPM server 212 generates 615 a manufacturing bill of materials 124 based on the determined plurality of parts 116 prior to the completion of a manufacturing process plan 126 (shown in FIG. 1). By generating 615 MBOM 124 prior to the completion of MPP 126, MPM server 212 reduces the inherent delay in manufacturing caused by not knowing the MBOM 124 prior to completion of MPP 126, allowing for scheduling and planning to begin earlier.

In some embodiments, a change will be made to engineering design 102 after MPP 126 has been generated. In these embodiments, MPM server 212 receives the updated engineering design 102. MPM server 212 determines one or more differences between the original engineering design 102 and the updated engineering design 102. In some further embodiments, this updated engineering design 102 is for a different configuration of the product. MPM server 212 updates the features 104 associated with the engineering design 102 based on the change. MPM server 212 updates the attributes 120 based on the changes to the features 104. MPM server 212 continues the changes through to update the MPP 126. MPM server 212 generates a second MPP 126 that contains only the attributes of the MPP 126 that did not change as a result of the engineering design 102. MPM server 212 also maintains the MPP 126 for the original configuration of the engineering design 102. MPM server 212 highlights the changes to the MPP 126 so that the changes may be reviewed by a manufacturing engineer, rather than having to review the parts of the MPP 126 that did not change.

When MPM server 212 receives a change to one of the attributes 104 associated with an engineering design 102, MPM server 212 determines one or more processes, such as process A 136 that are associated with the changed attribute 120. MPM server 212 determines an update to the one or more processes based on the change in the attribute 120. MPM server 212 modifies the MPP 126 based on the determined update. For example, if a tolerance 112 (shown in FIG. 1) changes, then MPM server 212 updates any process that is associated with that tolerance 112.

In some embodiments, MPM server 212 stores data for manufacturing multiple configurations of a product. For example, in an aircraft product, each configuration could be based on a different engine hook-up. Rather than storing each configuration as a separate MPP 126, MPM server 212 stores all of the common data in one MPP 126 and then stores all of the differences associated with each individual configuration on its own. When manufacturing configuration A, MPM server 212 retrieves the configuration A data and the common MPP 126, combines the configuration A data and the common MPP 126, and provides the combination to the user 301. In some embodiments, MPM server 212 generates the common data and the configuration data from MPPs 126 associated with two or three configurations. In other embodiments, MPM server 212 stores an MPP 126 associated with a first configuration. When the MPM server 212 receives an engineering design 102 for a second configuration, MPM server 212 determines the common features and the differences to store separately. In still other embodiments, the common features and the differences are indicated by the user 301.

In some embodiments, the product will be made in multiple locations on different manufacturing line. Each manufacturing line may have differences in how the line will assemble the product. MPM server 212 receives a first plurality of data based on a first production line and a second plurality of data based on a second production line. In these embodiments, each production line is configured to assemble the first configuration of the product. MPM server 212 generates a first manufacturing process plan 126 based on the first plurality of data and the first engineering design 102. Then MPM server 212 modifies the first manufacturing process plan 126 to generate a second manufacturing process plan 126 based on the second plurality of data. This second manufacturing process plan 126 integrates the differences that the second production line will introduce into the manufacturing process.

In some embodiments, a product may include a plurality of installations. Installations are a non-physical collection of parts, for example the entertainment system on an aircraft. In these embodiments, the engineering design 102 includes a plurality of installations. MPM server 212 stores a first manufacturing process plan 126 for the first configuration. The first manufacturing process plan 126 includes a plurality of processes, such as process A 136, associated with the plurality of installations. MPM server 212 receives a change to one installation of the plurality of installations. MPM server 212 determines one or more processes 136 of the plurality of processes associated with the one installation. MPM server 212 determines an update to the one or more processes 136 based on the received change. MPM server 212 modifies the first manufacturing process plan 126 based on the determined update.

In some embodiments, a change to a part is automatically updated through all of the flow 100 (shown in FIG. 1). Other changes to a part are required to be reviewed and approved by a user 301, such as a manufacturing engineer. In some of these embodiments, the threshold is whether the change is made to the part itself, or if the change changes the part to a different part. In these latter embodiments, user 301 must make a decision including, but not limited to, generating a new manufacturing process plan 126, updating the first manufacturing process plan 126 with the new part, and rejecting the change.

In some embodiments, different parts, procedures, techniques, etc. are required to be performed by someone certified in the proper installation or procedures. In these embodiments, the engineering design 102 includes these required certifications and MPM server 212 receives one or more certifications of a mechanic to perform a process of the plurality of processes. MPM server 212 compares the one or more certifications with the certifications corresponding to the process to be performed. When there is not a match based on the comparison, MPM server 212 generates an alert.

In some embodiments, MPM server 212 autovalidates the MPP 126. In these embodiments, MPM server 212 stores a first manufacturing process plan 126 for the first configuration. MPM server 212 compares the plurality of features 104 associated with the first engineering design 102 with the first manufacturing process plan 126. MPM server 212 determines one or more differences based on the comparison. MPM server 212 generates a report based on the one or more differences. MPM server 212 provides the report to the user 301.

In some embodiments, MPM server 212 generates and stores a series of templates based on past engineering designs 102 and MPPs 126. When designing and manufacturing multiple products of the same type, such as aircraft, many of the requirements and systems will be the same or similar between the products. It streamlines the design process and the manufacturing process to have previously prepared templates that a user 301 can use. In these embodiments, MPM server 212 receives a plurality of historical engineering designs. MPM server 212 receives a plurality of historical manufacturing process plans associated with the plurality of historical engineering designs. Then MPM server 212 generate a plurality of operation templates based on the plurality of historical engineering designs and the plurality of historical manufacturing process plans. In addition many items in the engineering design 102 may be the same and the process to install or manufacture would then be the same as well. These items include, but are not limited to, a structure, such as a closest, or a commodity, such as an entertainment system. The template would then include the series of steps 170 (shown in FIG. 1) required to manufacture the closet and could then be dropped directly into engineering design 102 at the desired location. Other templates may be generated based on the required order of operations from the historical MPPs. For example, if operations A, B, and C have to be performed each time in that order, then MPM server 212 may put those three operations in a template together in that order.

In some embodiments, each time a change is made to the engineering design 102 is associated with a new revision of the product. For example, if a new steering wheel is added to the product, then the revision of the product would go from A to B. However, many times there are multiple minor changes to the manufacturing of the product, such as a new process is used to improve tensile strength of a bond. These are change levels, and a revision might have multiple change levels associated with it. Some change levels might also be for backing out previous change levels and effectively returning to a previous change level. In some further embodiments, when a new revision is made, it may be desired that some or all of the change levels associated with the pervious revision be included. In these embodiments, MPM server 212 stores a first revision manufacturing process plan 126 for the first configuration including a revision number and a plurality of manufacturing change levels. MPM server 212 receives a request from a user 301 to generate a new revision of the manufacturing process 126 plan based on a change to the first engineering design 102 and the request includes a selection of manufacturing change level of the plurality of manufacturing change levels. MPM server 212 generates a second revision manufacturing process plan 126 based the selected manufacturing change level of the first revision manufacturing process plan and the change.

Figure 7:
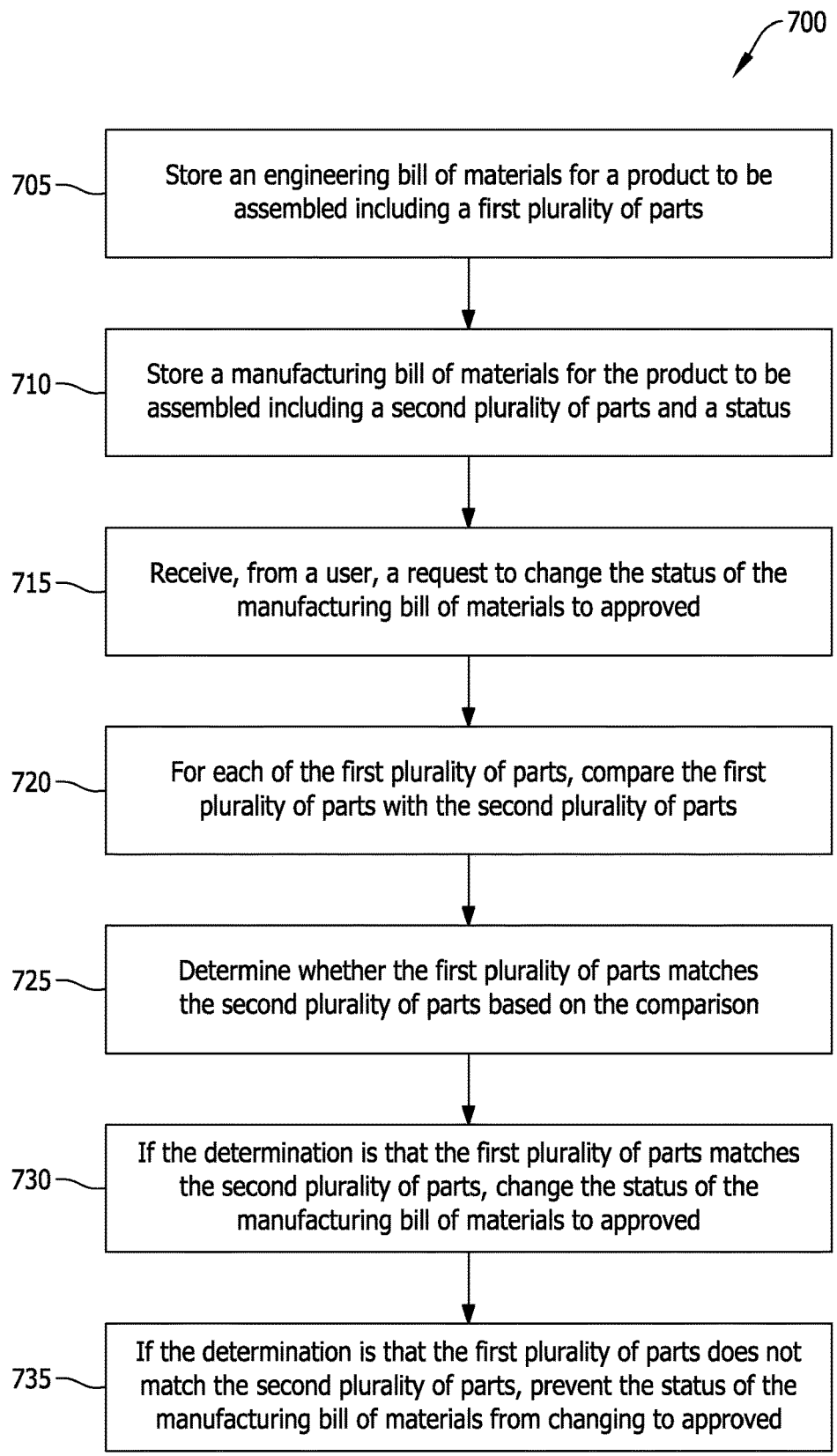
FIG. 7 is a flowchart illustrating an example of a process of managing a manufacturing bill of materials using the system shown in FIG. 2, in accordance with one embodiment of the disclosure.

FIG. 7 is a flowchart illustrating an example of a process 700 of managing a manufacturing bill of materials 124 using the system 200 shown in FIG. 2, in accordance with one embodiment of the disclosure. Process 700 may be implemented by a computing device, for example MPM server 212 (shown in FIG. 2).

In the example embodiment, MPM server 212 stores 705 an engineering bill of materials 118 for a product to be assembled including a first plurality of parts 116 (both shown in FIG. 1). MPM server 212 stores 710 a manufacturing bill of materials 124 (shown in FIG. 1) for the product to be assembled including a second plurality of parts 116 and a status. MPM server 212 receives 715, from a user 301 (shown in FIG. 1), a request to change the status of the manufacturing bill of materials 124. The status change is from a first status to a second status. For example, the change from the first to the second status is from not approved to approved, from not released to released, or any other status change for the manufacturing bill of materials 124. For each of the first plurality of parts 116, MPM server 212 compares 720 the first plurality of parts 116 with the second plurality of parts 116. MPM server 212 determines 725 whether the first plurality of parts 116 matches the second plurality of parts 116 based on the comparison. If the determination is that the first plurality of parts 116 matches the second plurality of parts 116, MPM server 212 changes 730 the status of the manufacturing bill of materials 124 to approved. If the determination is that the first plurality of parts 116 does not match the second plurality of parts 116, MPM server 212 prevents 735 the status of the manufacturing bill of materials 124 from changing to approved. In some embodiments, MPM server 212 generates a report and transmits the report to a user 301 (shown in FIG. 1). The report identifies each difference between the first plurality of parts 116 and the second plurality of parts 116.

In some manufacturing embodiments, work not be performed on the product unless it is associated with an operation 164 or a step 170 (both shown in FIG. 1) outlined in the MPP 126. However, situations arise where a part needs to be removed from the product. To be able to properly instruct a worker to remove the undesired part, MPM server 212 temporarily adds the part to be removed to the MPP 126. In these embodiments, MPM server 212 receives a temporary removal part from the user 301. MPM server 212 adds the temporary removal part to the manufacturing bill of materials 124. MPM server 212 issues a work order to remove the temporary removal part. The user 301 removes the temporary removal part from the product being assembled.

In some embodiments, the engineering bill of materials 118 includes multiple instances of the same part. In these embodiments, MPM server 212 stores a first instance number with the first part at a first location in the product and stores a second instance number with the first part at a second location in the product.

In some embodiments, installing or producing different parts is dependent on having other parts or materials. These other parts or materials take time to manufacture or receive from a supplier, this time is known as lead time. For example, part A 132 takes 20 days to procure, while part B 134 (both shown in FIG. 1) takes 50 days. These lead times may be calculate based on the engineering design 102, for example, when generating or approving the MPP 126. In these embodiments, MPM server 212 determines a lead time for each part of the first plurality of parts 116 based on the manufacturing bill of materials 124 and determines a date needed for each part of the plurality of parts 116 based on the manufacturing bill of materials 124 and the plurality of lead times. The date needed is based on when the corresponding part is needed in production of the product.

However, whenever a change is made to the engineering design 102, these lead times need to be recalculated and checked to see if any conflicts or bottlenecks occur. In these embodiments, MPM server 212 receives at least one change to the engineering bill of materials 118. MPM server 212 determines at least one conflict based on the plurality of dates needed, the plurality of lead times, and the received at least one change. MPM server 212 generates a lead time report based on at least one conflict.

In some embodiments, multiple manufacturing lines are producing different configurations of the product. For example, a client orders six aircraft of configuration A. At a later time, but before all of the ordered aircraft are delivered, the same client orders five more aircraft of configuration B. Since different manufacturing lines produce aircraft at different speeds, it is potentially possible that a configuration A aircraft could be delivered after a configuration B aircraft. To alert the user 301 of the potential of this occurrence, MPM server 212 receives information on a plurality of production lines configured to manufacture the product based on the manufacturing bill of materials. MPM server 212 determines a production schedule for each of the plurality of production lines based on the manufacturing bill of materials 124 and the received information. MPM server 212 receives a second manufacturing bill of materials 124 for a second configuration of the product. MPM server 212 determines a second production schedule for each of the plurality of production lines based on the second manufacturing bill of materials 124 and the received information. MPM server 212 determines whether at least one product of the first configuration will be completed after at least one product of the second configuration based on the first plurality of production schedules and the second plurality of production schedules. MPM server 212 generates an alert if the determination is that at least one product of the first configuration will be completed after at least one product of the second configuration and provides the alert to the user 301. In some embodiments, MPM server 212 receives the second manufacturing bill of materials after production has begun on the first configuration of the product.

Figure 8:
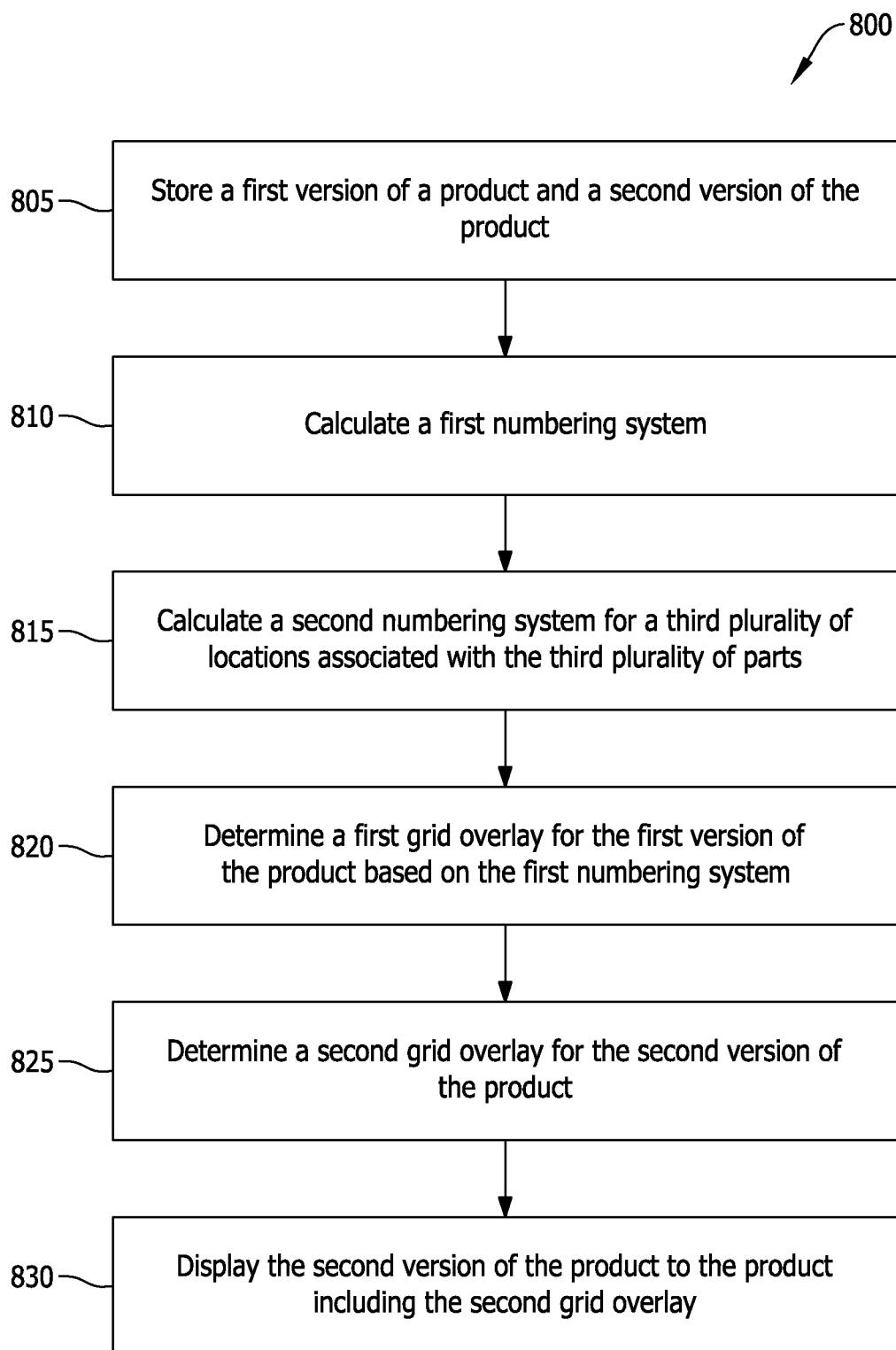
FIG. 8 is a flowchart illustrating an example of a process of using a grid overlay with multiple versions of a product using the system shown in FIG. 2, in accordance with one embodiment of the disclosure.

FIG. 8 is a flowchart illustrating an example of a process 800 of using a grid overlay with multiple versions of a product using system 200 shown in FIG. 2, in accordance with one embodiment of the disclosure. Process 800 may be implemented by a computing device, for example MPM server 212 (shown in FIG. 2).

In the example embodiment, MPM server 212 stores 805 a first version of a product and a second version of the product. The second version extends the first version by a plug at a first location. The first version includes a first plurality of parts at a first plurality of locations and a second plurality of parts 116 at a second plurality of locations. The second version includes the first plurality of parts 116, the second plurality of parts, and a third plurality of parts associated with the plug. The first location is between the first plurality of locations and the second plurality of locations.

MPM server 212 calculates 810 a first numbering system. Each of the first plurality of locations and the second plurality of locations includes a location number based on the first numbering system. MPM server 212 calculates 815 a second numbering system for a third plurality of locations associated with the third plurality of parts. MPM server 212 determines 820 a first grid overlay for the first version of the product based on the first numbering system. MPM server 212 determines 825 a second grid overlay for the second version of the product based on the first numbering system and the second numbering system. MPM server 212 displays 830, to user (301 shown in FIG. 3), the second version of the product including the second grid overlay.

For example, the first version of the product is an aircraft 100' long. The second version of the product is effectively the same aircraft but with 2 more rows of seats making it 110' long. The plug is placed after row 4 and refers to the two rows of seats that effectively move the rest of the aircraft back from the nose of the aircraft. In the example embodiment, the first numbering system is based on the nose of the plane and is considered either the station line, the water line, or buttock line. The numbering starts at the nose of the aircraft and continues to the tail of the aircraft. So the end of row 4 would be at number 40 and the end of row 5 would be at number 45. In other embodiments, the first numbering system may start at the top of the product, the bottom of the product, the center of the product, or any other location appropriate to the product itself. The second numbering system starts from the front of the plug where the front is oriented towards the nose of the plane. If the plug is placed at the end of row 4, aka number 40, then the numbering for the plug starts at number 40 and the numbering for the rest of the aircraft pauses at that point. So the numbering for the end of the first row of seats in the plug would be 40+5, where 40 is the start of the plug and 5 is the distance to the start of the plug. After the second plug row and the end of the plug, the first numbering would continue with 41, 42 . . . . In this way the numbering system stays the same for parts and procedures that are not necessary to the added plug. While the above is designated as first number+second number, other notation methodologies are possible.

In some embodiments, three dimensional (3D) views of areas of the product are stored to instruct workers on how the assembled or partially assembled area should look. However, as plugs are inserted or changes are made that shift where the 3D view is referring to. To ensure that the 3D view stays relative to the parts to be installed, the 3D view is associated with one of the parts in the view. When the part shifts, the view shifts with it. In these embodiments, MPM server 212 stores a three dimensional (3D) view of an area of the first version of the product. The area includes a second plurality of parts. MPM server 212 associates the 3D view with one part of the second plurality of parts included in the 3D view. The location corresponding to the one part of a second plurality of parts is assigned to the 3D view. MPM server 212 shifts the 3D view based on the first numbering system when displaying the second version of the product to correspond with the associated one part.

In some embodiments, a closer view of a part or installation to be installed in the product is desired. In these embodiments, a user is able to zoom-in to the part from an overhead view of the entire product. In some embodiments, the zoom-in view includes the location of the part using the station line, the water line, and/or buttock line. In these embodiments, MPM server 212 displays a pre-defined view of the product. For example, the pre-defined view is a top view, a side view, a bottom view, or any other pre-defined view capable of displaying the part. MPM server 212 receives, from the user 301, a request to zoom-in on a view of an installation. MPM server 212 displays a zoom-in view of the installation including one or more numbers associated with the first numbering system.

In some embodiments, the user 301 is able to toggle the display of the grid overlay on and off.

In some embodiments, multiple parts with the same part number may be installed in the product. While each part may have an instance number as described above, the actual part number for the part stays the same to ensure that the correct part is installed. For example, aisle seats on the left side of the aircraft all have the same part number, but each one is installed at a different position in the plane. However, the part number stays the same for each. Each part is differentiated by an instance number (described above) or the location where the part is installed based on the first or second numbering system.

Figure 9:
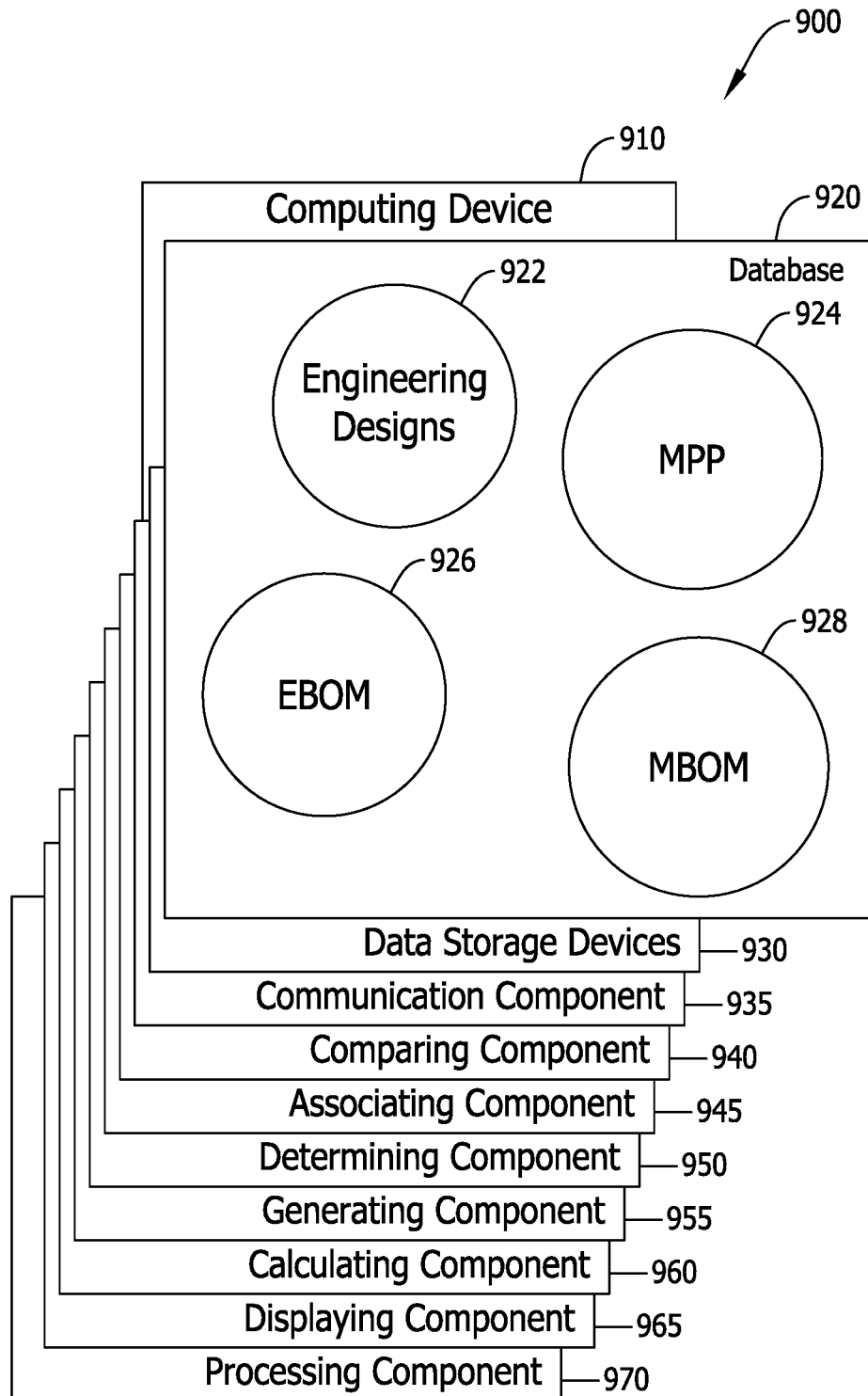
FIG. 9 is a diagram of components of one or more example computing devices that may be used in the system shown in FIG. 2

FIG. 9 is a diagram 900 of components of one or more example computing devices that may be used in the system 200 shown in FIG. 2. In some embodiments, computing device 910 is similar to MPM server 212 (shown in FIG. 2). Database 920 may be coupled with several separate components within computing device 910, which perform specific tasks. In this embodiment, database 920 includes engineering designs 922, such as engineering design 102 (shown in FIG. 1), manufacturing process plans 924, such as MPP 126 (shown in FIG. 1), engineering bills of materials 926, such as EBOM 118 (shown in FIG. 1), and manufacturing bills of materials 928, such as MBOM 124 (shown in FIG. 1). In some embodiments, database 920 is similar to database 220 (shown in FIG. 2).

Computing device 910 includes the database 920, as well as data storage devices 930. Computing device 910 also includes a communication component 935 for receiving 505 a first engineering design (shown in FIG. 5), receiving 510 a first manufacturing process plan (shown in FIG. 5), receiving 525 a notification (shown in FIG. 5), receiving 605 a first engineering design (shown in FIG. 6), and receiving 715 a user request (shown in FIG. 7). Computing device 910 also includes a comparing component 940 for comparing 515 the plurality of operations (shown in FIG. 5), and comparing 720 the first plurality of parts (shown in FIG. 7). Computer device 910 further includes an associating component 945 for associating 520 each requirement (shown in FIG. 5). A determining component 950 is also included for determining 610 a plurality of parts (shown in FIG. 6), determining 725 whether the first plurality of parts (shown in FIG. 7), determining 820 a first grid overlay, and determining 825 a second grid overlay (both shown in FIG. 8). Computing device 910 further includes a generating component 955 for generating 615 a manufacturing bill of materials (shown in FIG. 6). Moreover, a calculating component 960 is included for calculating 810 a first number system and calculating 815 a second number system (both shown in FIG. 8). In addition a display component 965 is included for displaying 830 the second version (shown in FIG. 8). A processing component 970 assists with execution of computer-executable instructions associated with the system.

The systems and processes are not limited to the specific embodiments described herein. In addition, components of each system and each process can be practiced independent and separate from other components and processes described herein. Each component and process also can be used in combination with other assembly packages and processes.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A manufacturing process management (MPM) computer device comprising a processor and at least one non-transitory memory device, wherein said processor is in communication with said at least one non-transitory memory device, said MPM computer device configured to:
store an engineering bill of materials for an aircraft to be assembled including a first plurality of parts;
determine based on lead times and a change among the first plurality of parts, that a bottleneck exists in the engineering bill of materials;
store a manufacturing bill of materials, for a first configuration of the aircraft to be assembled, including a second plurality of parts and a status of the change, wherein the change includes a plug insertion at a location corresponding to a station line, a water line or a buttock line of the aircraft;
receive schedule information on first and second production lines configured to manufacture the aircraft at different speeds based on the manufacturing bill of materials;
determine a first production schedule for the first production line based on the manufacturing bill of materials and the received schedule information;
after production has begun on the first production line to manufacture a complete version of the first configuration of the aircraft, receive a second manufacturing bill of materials for a second configuration of the aircraft;
determine a second production schedule for the second production line based on the second manufacturing bill of materials and the received schedule information, wherein the second production line is configured to manufacture a complete version of the second configuration of the aircraft by extending the first configuration from the location of the plug insertion;
compare the engineering bill of materials with the manufacturing bill of materials, and based on the comparison:
determine that the aircraft of the first configuration will be completed on the first production line after the aircraft of the second configuration on the second production line based on the different manufacturing speeds in the first and second production lines;
identify respective differences between each of the first plurality of parts and the second plurality of parts;
generate a three dimensional view of an area of the first configuration of the aircraft and the second plurality of parts;
trigger the change, in the three dimensional view based on the plug insertion;
determine a first grid overlay, for the first configuration, from a nose of the aircraft to a tail of the aircraft;
determine a second grid overlay for the second configuration;
display the second configuration including the second grid overlay;
shift a part of the first configuration and further shift the changed three dimensional view together with the shifted part, wherein the shifted three dimensional view is associated with a part of the second plurality of parts included in the three dimensional view; and
further shift the three dimensional view when displaying the second configuration of the aircraft to correspond to the associated part, wherein the displayed second configuration includes a zoom-in of a location of installation of the associated part from an overhead view of the aircraft by referencing to the station line, the water line, or the buttock line of the aircraft in order to differentiate the associated part from other multiple parts of a same part number.

2. The manufacturing process management (MPM) computer device of claim 1, wherein said MPM computer device is further configured to:
generate a report based on comparing the first plurality of parts with the second plurality of parts; and
provide the report to a user.

3. The manufacturing process management (MPM) computer device of claim 2, wherein the report identifies the respective differences between the each of the first plurality of parts and the second plurality of parts.

4. The manufacturing process management (MPM) computer device of claim 2, wherein said MPM computer device is further configured to:
receive a temporary removal part from the user;
add the temporary removal part to the manufacturing bill of materials; and
issue a work order to remove the temporary removal part.

5. The manufacturing process management (MPM) computer device of claim 1, wherein the engineering bill of materials includes two instances of a first part in the first plurality of parts, and wherein the MPM computer device is configured to:
store a first instance number with the first part at a first location in the aircraft; and
store a second instance number with the first part at a second location in the aircraft.

6. The manufacturing process management (MPM) computer device of claim 1, wherein said MPM computer device is further configured to:
determine a date needed for each part of the first plurality of parts based on the manufacturing bill of materials and the lead times.

7. The manufacturing process management (MPM) computer device of claim 6, wherein said MPM computer device is further configured to:
generate a lead time report based on the bottleneck.

8. A computer implemented method comprising:
storing, by a processor, an engineering bill of materials for an aircraft to be assembled including a first plurality of parts;
determining, by the processor, based on lead times and a change among the first plurality of parts, that a bottleneck exists in the engineering bill of materials;
storing, by the processor, a manufacturing bill of materials for a first configuration of the aircraft to be assembled including a second plurality of parts and a status of the change, wherein the change includes a plug insertion at a location corresponding to a station line, a water line or a buttock line of the aircraft;
receiving, by the processor, schedule information on first and second production lines configured to manufacture the aircraft at different speeds based on the manufacturing bill of materials;
determining, by the processor, a first production schedule for the first production line based on the manufacturing bill of materials and the received schedule information;
after production has begun on the first production line to manufacture a complete version of the first configuration of the aircraft, receiving, by the processor, a second manufacturing bill of materials for a second configuration of the aircraft;
determining, by the processor, a second production schedule for the second production line based on the second manufacturing bill of materials and the received schedule information, wherein the second production line is configured to manufacture a complete version of the second configuration of the aircraft by extending the first configuration from the location of the plug insertion;
comparing, by the processor, the engineering bill of materials with the manufacturing bill of materials, and based on the comparison:
determining, by the processor, that the aircraft of the first configuration will be completed on the first production line after the aircraft of the second configuration on the second production line based on the different manufacturing speeds in the first and second production lines;
identifying, by the processor, respective differences between each of the first plurality of parts and the second plurality of parts;
generating, by the processor, a three dimensional view of an area of the first configuration of the aircraft and the second plurality of parts;
triggering, by the processor, the change, in the three dimensional view based on the plug insertion;
determining, by the processor, a first grid overlay, for the first configuration, from a nose of the aircraft to a tail of the aircraft;
determining, by the processor, a second grid overlay for the second configuration;
displaying, by the processor, the second configuration including the second grid overlay;
shifting, by the processor, a part of the first configuration and further shift the changed three dimensional view together with the shifted part, wherein the shifted three dimensional view is associated with a part of the second plurality of parts included in the three dimensional view; and
further shifting, by the processor, the three dimensional view when displaying the second configuration of the aircraft to correspond to the associated part, wherein the displayed second configuration includes a zoom-in of a location of installation of the associated part from an overhead view of the aircraft by referencing to the station line, the water line, or the buttock line of the aircraft in order to differentiate the associated part from other multiple parts of a same part number.

9. The computer implemented method of claim 8, further comprising:
generating, by the processor, a report based on comparing the first plurality of parts with the second plurality of parts; and
providing, by the processor, the report to a user.

10. The computer implemented method of claim 9, wherein the report identifies the respective differences between the each of the first plurality of parts and the second plurality of parts.

11. The computer implemented method of claim 9, further comprising:
receiving, by the processor, a temporary removal part from the user;
adding, by the processor, the temporary removal part to the manufacturing bill of materials; and
issuing, by the processor, a work order to remove the temporary removal part.

12. The computer implemented method of claim 8, wherein the engineering bill of materials includes two instances of a first part in the first plurality of parts, and further:
storing, by the processor, a first instance number with the first part at a first location in the aircraft; and
storing, by the processor, a second instance number with the first part at a second location in the aircraft.

13. The computer implemented method of claim 8, further comprising:
determining, by the processor, a date needed for each part of the first plurality of parts based on the manufacturing bill of materials and the lead times.

14. The computer implemented method of claim 13, further comprising:

generating, by the processor, a lead time report based on the bottleneck.

15. A non-transitory computer-readable storage media having computer-executable instructions embodied thereon, which, when executed by a processor, cause said processor to:
- store an engineering bill of materials for an aircraft to be assembled including a first plurality of parts;
- determine based on lead times and a change among the first plurality of parts, that a bottleneck exists in the engineering bill of materials;
- store a manufacturing bill of materials for a first configuration of the aircraft to be assembled including a second plurality of parts and a status of the change, wherein the change includes a plug insertion at a location corresponding to a station line, a water line or a buttock line of the aircraft;
- receive schedule information on first and second production lines configured to manufacture the aircraft at different speeds based on the manufacturing bill of materials;
- determine a first production schedule for the first production line based on the manufacturing bill of materials and the received schedule information;
- after production has begun on the first production line to manufacture a complete version of the first configuration of the aircraft, receive a second manufacturing bill of materials for a second configuration of the aircraft;
- determine a second production schedule for the second production line based on the second manufacturing bill of materials and the received schedule information, wherein the second production line is configured to manufacture a complete version of the second configuration of the aircraft by extending the first configuration from the location of the plug insertion;
- compare the engineering bill of materials with the manufacturing bill of materials, and based on the comparison:
  - determine that the aircraft of the first configuration will be completed on the first production line after the aircraft of the second configuration on the second production line based on the different manufacturing speeds in the first and second production lines;
  - identify respective differences between each of the first plurality of parts and the second plurality of parts;
  - generate a three dimensional view of an area of the first configuration of the aircraft and the second plurality of parts;
  - trigger the change, in the three dimensional view based on the plug insertion;
  - determine a first grid overlay, for the first configuration, from a nose of the aircraft to a tail of the aircraft;
  - determine a second grid overlay for the second configuration;
  - display the second configuration including the second grid overlay;
  - shift a part of the first configuration and further shift the changed three dimensional view together with the shifted part, wherein the shifted three dimensional view is associated with a part of the second plurality of parts included in the three dimensional view; and
  - further shift the three dimensional view when displaying the second configuration of the aircraft to correspond to the associated part, wherein the displayed second configuration includes a zoom-in of a location of installation of the associated part from an overhead view of the aircraft by referencing to the station line, the water line, or the buttock line of the aircraft in order to differentiate the associated part from other multiple parts of a same part number.

16. The non-transitory computer-readable storage media of claim 15, wherein the embodied computer-executable instructions are further executed by the processor to:
- generate a report based on comparing the first plurality of parts with the second plurality of parts; and
- provide the report to a user.

17. The non-transitory computer-readable storage media of claim 16, wherein the report identifies the respective differences between the each of the first plurality of parts and the second plurality of parts.

18. The non-transitory computer-readable storage media of claim 16, wherein the embodied computer-executable instructions are further executed by the processor to:
- receive a temporary removal part from the user;
- add the temporary removal part to the manufacturing bill of materials; and
- issue a work order to remove the temporary removal part.

19. The non-transitory computer-readable storage media of claim 15, wherein the engineering bill of materials includes two instances of a first part in the first plurality of parts, and wherein the embodied computer-executable instructions are further executed by the processor to:
- store a first instance number with the first part at a first location in the aircraft; and
- store a second instance number with the first part at a second location in the aircraft.

20. The non-transitory computer-readable storage media of claim 15, wherein the embodied computer-executable instructions are further executed by the processor to:
- determine a date needed for each part of the first plurality of parts based on the manufacturing bill of materials and the lead times.

21. The non-transitory computer-readable storage media of claim 20, wherein the embodied computer-executable instructions are further executed by the processor to:
- generate a lead time report based on the bottleneck.

* * * * *